(No Model.)
2 Sheets—Sheet 1.
F. COOK.
CANE JUICE EVAPORATOR.
No. 280,293. Patented June 26, 1883.
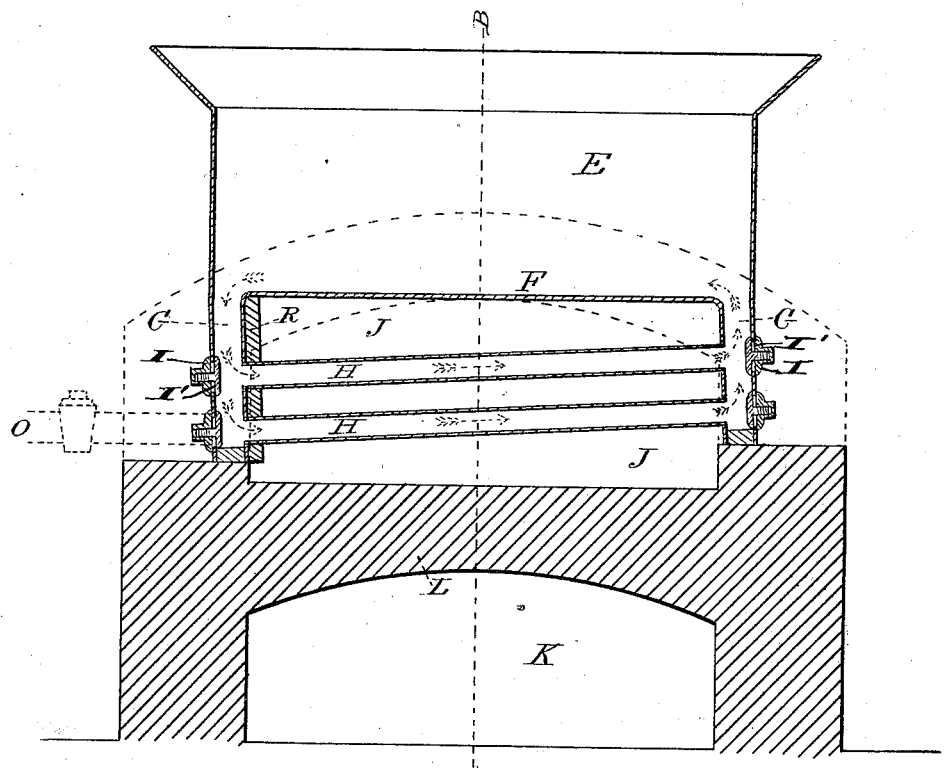
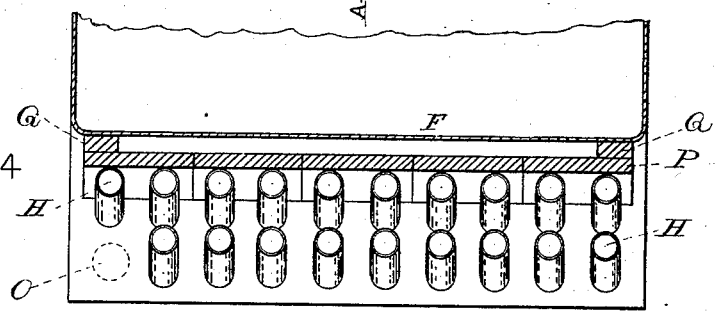
WITNESSES
INVENTOR

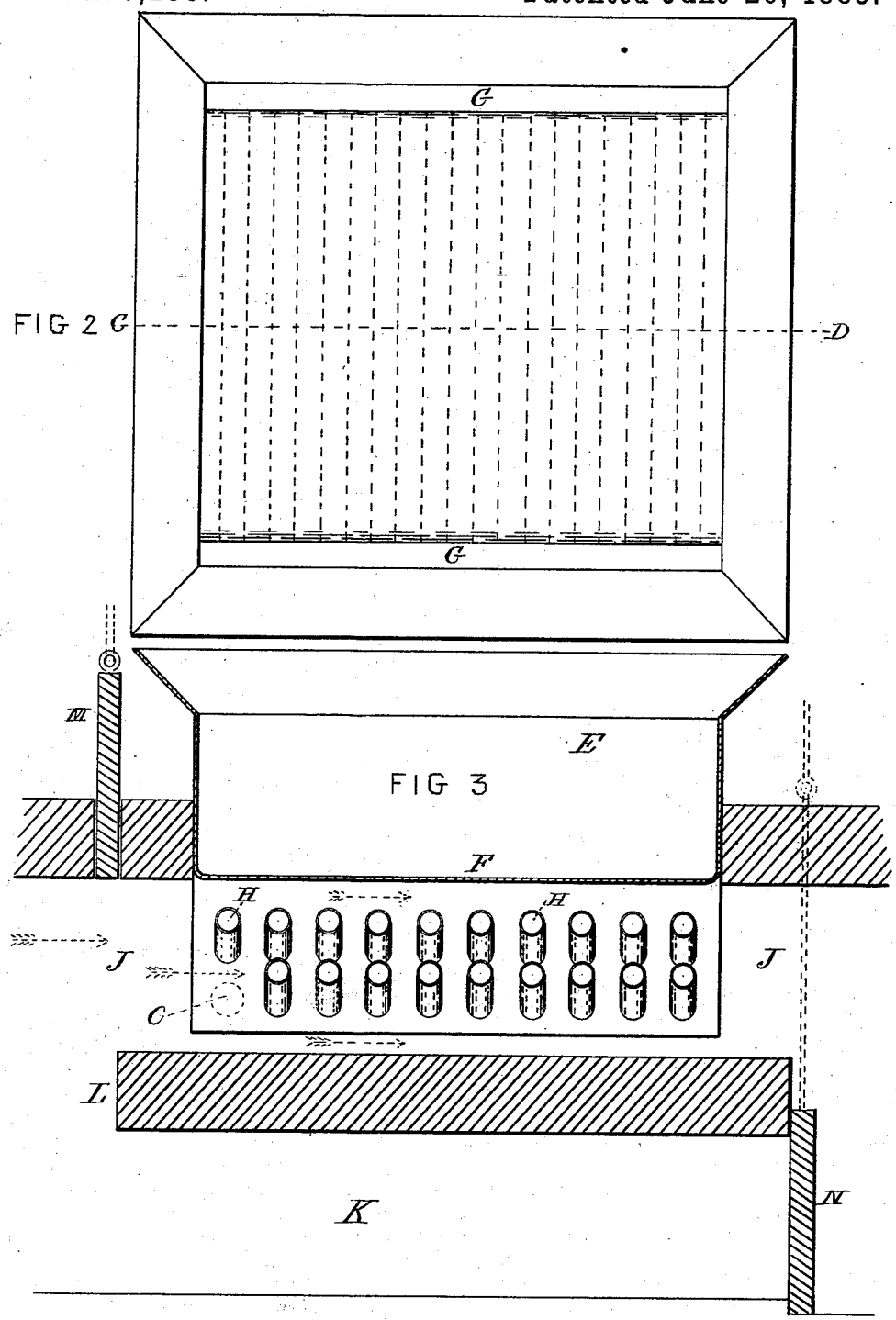

UNITED STATES PATENT OFFICE.

FREDERIC COOK, OF NEW ORLEANS, LOUISIANA.

CANE-JUICE EVAPORATOR.

SPECIFICATION forming part of Letters Patent No. 280,293, dated June 26, 1883.

Application filed April 2, 1883. (No model.)

*To all whom it may concern:*

Be it known that I, FREDERIC COOK, a citizen of the United States, residing at New Orleans, in the parish of Orleans and State of Louisiana, have invented a new and useful Improvement in Open Cane-Juice Evaporators for Working with Fire Heat, of which the following is a specification.

My invention relates, first, to improvements in open evaporators for fire heat, in which I obtain largely-increased fire-surface over anything, I believe, before invented, by means of external tubes in the fire-flue, surrounded by heat, and through which tubes the juice circulates. The steam generated from the evaporation rises to the highest end of the inclined tubes, and an upward current of juice is established. It flows from tubes to upper part of pan, the juice from pan flows into lowest end of tubes, and thus a current is produced through the evaporating-tubes, which causes a rapid evaporation, and prevents, to a large extent, the formation of scale. Secondly, to make an open evaporator for fire heat, whose bottom is protected from the fire by a shield, depending for evaporating-surface on the external juice-tubes in the fire-flue. I attain these objects by the pan illustrated in the accompanying drawings, in two sheets, in which—

Figure 1 is a cross-section of pan and its setting. Fig. 2 is a top view of pan. Fig. 3 is a longitudinal section of pan and setting, through line C D of Fig. 2, or A B, Fig. 1. Fig. 4 is part of a longitudinal section of pan and shield under bottom.

Similar letters refer to similar parts throughout the several views.

The pan E, I prefer making of rolled plate-iron and of square or oblong shape, with four sides and a bottom. From the bottom F juice-legs G descend the whole length of the pan each side. Into these juice-legs G the evaporating-tubes H are expanded, and are set inclined, to give a circulation of juice, the hottest juice and steam rising to the highest end. The arrows at Fig. 1 show the circulation of the juice, which, with a high heat, becomes constant. The juice-legs G also form legs for the pans to stand on, and are longitudinal with the fire-flue, the juice-tubes H passing across the fire-flue J.

At I are openings opposite each tube, suitably stopped by caps and joints I', easily removed, for the double purpose of cleaning inside of tubes and of expanding a fresh tube in, should it be necessary.

J is the fire-flue. The arrows in Fig. 3 show course of fire heat.

K is a secondary fire-flue, divided from J by arch L.

M and N are balanced dampers, arranged so that when M descends and shuts off heat from flue J, N opens flue K to the draft, and the heat is shut off from the pan. This arrangement of double flues and dampers is included in a previous application I made for a patent; but I desire now to show and describe its adaptability to my present new open evaporator.

O is the discharge-cock for sirup.

Fig. 4 shows a part of pan in longitudinal section, same as Fig. 3, but with the addition of the shield P, which I may find desirable to use. This shield P is made of fire-brick or other suitable material. It rests on upper row of tubes, H, and is bricked up to bottom of pan, each end, at Q. This shuts off the bottom F from direct action of the fire, and renders pans more durable. The inside of juice-legs next the fire, at R, I prefer also to line with fire-tiles, in which case nothing but tubes H will be exposed to the fire, which give abundant evaporating-surface to any required extent, and a very durable open evaporator is produced, easily cleaned or repaired.

It is obvious that one or more of these evaporators can be worked with direct fire heat from coal, wood, bagasse, or any other suitable fuel, and also to advantage with the waste heat from under steam-boilers, when the temperature of the waste heat equals or exceeds the temperature of steam at from ninety to one hundred pounds pressure, which is 324° to 332°, as generally used in coils of open evaporators working by steam; but, as I find a higher average temperature in such waste heat escaping to chimneys from steam-boilers, I can effect a great economy of fuel by utilizing it for working my described evaporators, in which I can obtain any required amount of heating-surface, and can regulate the heat as desired.

What I claim, and desire to secure by Letters Patent, is—

1. In an open evaporating-pan, the combination of the pan, open legs extending down from the pan, and a series of transverse evaporating-tubes arranged above one another and communicating at both ends with the vertical open legs, substantially as described.

2. In an open evaporating-pan, the combination of the pan, open legs extending down from the pan, and a series of transverse inclined evaporating-tubes communicating at opposite ends with the vertical open legs, substantially as described.

3. In an evaporating-pan having circulating-tubes beneath, shields of fire-clay between the bottom of the pan and tubes and fire, and along the sides of the pan next to the fire, substantially as described.

FREDERIC COOK.

Witnesses:
 THOS. J. CARVER,
 S. CONDIT.